US011456005B2

(12) United States Patent
Mosseri et al.

(10) Patent No.: US 11,456,005 B2
(45) Date of Patent: Sep. 27, 2022

(54) AUDIO-VISUAL SPEECH SEPARATION

(71) Applicant: GOOGLE LLC, Mountain View, CA (US)

(72) Inventors: Inbar Mosseri, Raanana (IL); Michael Rubinstein, Natick, MA (US); Ariel Ephrat, Efrat (IL); William Freeman, Acton, MA (US); Oran Lang, Givatayim (IL); Kevin William Wilson, Cambridge, MA (US); Tali Dekel, Arlington, MA (US); Avinatan Hassidim, Petach Tikva (IL)

(73) Assignee: Google LLC, Mountain View, CA (US)

( * ) Notice: Subject to any disclaimer, the term of this patent is extended or adjusted under 35 U.S.C. 154(b) by 33 days.

(21) Appl. No.: 16/761,707

(22) PCT Filed: Nov. 21, 2018

(86) PCT No.: PCT/US2018/062330
§ 371 (c)(1),
(2) Date: May 5, 2020

(87) PCT Pub. No.: WO2019/104229
PCT Pub. Date: May 31, 2019

(65) Prior Publication Data
US 2020/0335121 A1     Oct. 22, 2020

Related U.S. Application Data

(60) Provisional application No. 62/590,190, filed on Nov. 22, 2017.

(51) Int. Cl.
*G10L 21/10*     (2013.01)
*G06K 9/62*      (2022.01)
(Continued)

(52) U.S. Cl.
CPC ............ *G10L 21/10* (2013.01); *G06K 9/6256* (2013.01); *G06V 20/41* (2022.01); *G06V 40/161* (2022.01); *G10L 15/16* (2013.01); *G10L 21/18* (2013.01)

(58) Field of Classification Search
None
See application file for complete search history.

(56) References Cited

U.S. PATENT DOCUMENTS 5,621,858 A    4/1997   Stork et al.
8,543,402 B1   9/2013   Ma
(Continued)

OTHER PUBLICATIONS

Afouras et al. "The Conversation: Deep Audio-Visual Speech Enhancement," arXiv 1804.04121v2, Jun. 19, 2018, 5 pages.
(Continued)

*Primary Examiner* — Shaun Roberts
(74) *Attorney, Agent, or Firm* — Fish & Richardson P.C.

(57) ABSTRACT

Methods, systems, and apparatus, including computer programs encoded on computer storage media, for audio-visual speech separation. A method includes: obtaining, for each frame in a stream of frames from a video in which faces of one or more speakers have been detected, a respective per-frame face embedding of the face of each speaker; processing, for each speaker, the per-frame face embeddings of the face of the speaker to generate visual features for the face of the speaker; obtaining a spectrogram of an audio soundtrack for the video; processing the spectrogram to generate an audio embedding for the audio soundtrack; combining the visual features for the one or more speakers and the audio embedding for the audio soundtrack to generate an audio-visual embedding for the video; determining a respective spectrogram mask for each of the one or more speakers; and determining a respective isolated speech spectrogram for each speaker.

21 Claims, 4 Drawing Sheets

(51) Int. Cl.
    G10L 15/16    (2006.01)
    G10L 21/18    (2013.01)
    G06V 20/40    (2022.01)
    G06V 40/16    (2022.01)

(56)         References Cited

U.S. PATENT DOCUMENTS

| | | | |
|---|---|---|---|
| 2004/0260550 | A1 | 12/2004 | Burges et al. |
| 2005/0228673 | A1* | 10/2005 | Nefian ................... G10L 15/25 704/270 |
| 2007/0076902 | A1* | 4/2007 | Master ...................... H04S 7/00 381/94.3 |
| 2017/0061966 | A1 | 3/2017 | Marcheret et al. |
| 2017/0148453 | A1* | 5/2017 | Christoph ........... G10L 19/0208 |
| 2017/0178666 | A1* | 6/2017 | Yu ............................ G10L 25/30 |
| 2018/0082679 | A1* | 3/2018 | McCord ................ G10L 13/033 |
| 2018/0254040 | A1* | 9/2018 | Droppo ................... G10L 17/18 |

OTHER PUBLICATIONS

Casanovas et al. "Blind audiovisual source separation based on sparse redundant representation," IEE Transactions on Multimedia 12(5), May 18, 2010, 15 pages.
'catalog.idc/upenn.edu' [online] "TIMIT Acoustic-phonetic continuous speech corpus", JS Garofolo et al., Linguistic Data Consortium 1992, [Retrieved Aug. 12, 2020] Retrieved from Internet: URL<https://catalog.ldc.upenn.edu/LDC93S1> 1 pages.
Cherry et al. "Some experiments on the recognition of speech, with one and two ears," The Journal of the Acoustical Society of America, 25(5), Sep. 1953, 5 pages.
Chung et al. "Lip Reading Sentences in the Wild," arXiv 1611.05358v2, Jan. 30, 2017, 12 pages.
Cole et al. "Synthesizing normalized faces from facial identity features," CVPR, Jul. 21, 2017, 10 pages.
Delfarah et al. "Features for Masking-Based Monaural Speech Separation in Reverberant Conditions," IEEE/ACM Trans. On Audio Speech, and Language Processing 25(5), Mar. 27, 2017, 10 pages.
Ephrat et al. "Improved Speech Reconstruction from Silent Video," ICCV Workshop on Computer Vision for Audio-Visual Media, Jul. 21, 2017, 8 pages.
Erdogan et al. "Phase-sensitive and recognition boosted speech separation using deep recurrent neural networks," IEEE International Conference on Acoustics, Speech and Signal Processing, Apr. 19, 2015, 7 pages.
Feng et al. "Audio visual speech recognition with multimodal recurrent neural networks," IJCNN, May 14, 2017, 8 pages.
Gabbay et al. "Visual speech enhancement using noise-invariant training," arXiv 1711.08789v3, Jun. 13, 2018, 5 pages.
Gao et al. "Learning to separate object sounds by watching on labeled video," arXiv 1804.01665v2, Jul. 26, 2018, 19 pages.
Gemmeke et al. "Audio Set: An ontology and human labeled dataset for audio events," ICASSP, Mar. 5, 2017, 5 pages.
Golumbic et al. "Visual input enhances selective speech envelope tracking in auditory cortex at a "cocktail party"" The Journal of neuroscience; the official journal of the Society for Neuroscience 33(4), Jan. 23, 2013, 10 pages.
Harte et al. "TCD-TIMIT: An audio-visual corpus of continuous speech," IEEE Transactions on Multimedia 17(5), Feb. 26, 2015, 13 pages.
Harwath et al. "Unsupervised learning of spoken language with visual context," NIPS, Dec. 2016, 9 pages.
Hershey et al. "Audio-visual graphical models for speech processing," ICASSP, May 17, 2004, 4 pages.
Hershey et al. "Audio-visual sound separation via hidden Markkov models," NIPS, Dec. 2002, 8 pages.
Hershey et al. "Deep clustering: Discriminative embeddings for segmentation and separation," arXiv 1508.04306v1, Aug. 18, 2015, 10 pages.
Hines et al. "Speech intelligibility prediction using a neurogram similarity index measure," Speech Common, 54(2), Feb. 2012, 35 pages.
Hines et al. "ViSQOLAudio: An objective audio quality metric for low bitrate codecs", The Journal of the Acoustical Society of America, 137(6), Jun. 28, 2015, 8 pages.
Hoover et al. "Putting a face to the voice: fusing audio and visual signals across a video to determine speakers," arXiv 1706.00079v2, May 31, 2017, 5 pages.
Hou et al. "Audio-visual speech enhancement using multi-model deep convolutional neural networks," IEEE Transactions on Emerging Topics in Computational Intelligence 2(2), Mar. 23, 2018, 12 pages.
Hu et al. "Deep multimodal speaker naming," arXivl507.04831v1, Jul. 17, 2015, 4 pages.
Ioffe et al. "Batch Normalization: Accelerating Deep Network Training by Reducing Internal Covariate Shift," arXiv 1502.03167v3, Mar. 2, 2015, 11 pages.
Isik et al. "Single-channel multi-speaker separation using deep clustering," arXiv 1607.02173v1, 5 pages.
Khan "Audio-visual speaker separation," Ph.D. Dissertation, University of East Anglia, Aug. 2016, 201 pages.
Ma et al. "Lip-reading aids word recognition most in moderate noise: A bayesian explanation using high-dimensional feature space," PLoS One 4, Mar. 4, 2009, 14 pages.
Monaci. "Towards real-time audiovisual speaker localization", Signal Processing Conference, Aug. 29, 2011, 5 pages.
Mroueh et al. "Deep multimodal learning for audio-visual speech recognition," arXiv 1501.05396v1, Jan. 22, 2015, 8 pages.
Ngiam et al. "Multimodal deep learning," ICML, Jan. 1, 2011.
Owens et al. "Audio-visual scene analysis with self-supervised multisensory features," ECCV, Sep. 2018, 18 pages.
Patterson et al. "Moving-talker, speaker-independent feature study, and baseline results using the CUAVE multimodal speech corpus," Eurasip, Dec. 1, 2002, 13 pages.
PCT International Preliminary Report on Patentability issued in International Application No. PCT/US2018/062330, dated Oct. 8, 2019, 24 pages.
PCT International Search Report and Written Opinion issued in the International Application No. PCT/US2018/062330, dated Feb. 15, 2019, 15 pages.
Pu et al. "Audio-visual object localization and separation using low-rank and sparsity," ICASSP, Mar. 5, 2017, 6 pages.
Rivet et al. "Audio-visual speech source separation: An overview of key methodologies," IEEE Signal Processing Magazine, 31(3), Apr. 7, 2014, 19 pages.
Rix et al. "Perceptual evaluation of speech quality (PESQ)—a new method for speech quality assessment of telephone networks, and codecs," ICASSP, vol. 2, May 7, 2001, 4 pages.
Rudd et al. "MOON: A mixed objective optimization network for the recognition of facial attributes," arXiv 1603.07027v2, Oct. 21, 2016, 23 pages.
Sun et al. "Multiple-target deep learning for LSTM-RNN based speech enhancement," HSCMA, Mar. 1, 2017, 5 pages.
Taal et al. "A short-time objective intelligibility measure for time-frequency weighted noisy speech," ICASSP, Mar. 14, 2010, 4 pages.
Vincent et al. "Performance Measurement in Blind Audio source separation," Trans Audio Speech and Lang. Proc. 14(4), Jun. 19, 2006, 10 pages.
Vincent et al. "The second 'chime' speech separation and recognition challenge: Datasets, tasks and baselines," ICASSP, May 26, 2013, 6 pages.
Wang et al. "On training targets for supervised speech separation," ACM Trans. On Audio, Speech and Lang, Processing, 22(12), Aug. 28, 2014, 28 pages.
Wang et al. "Oracle performance investigation of the ideal masks," IWAENC, Sep. 13, 2016, 5 pages.
Wang et al. "Supervised speech separation based on deep learning: An Overview," arXiv 1708.07524v2, Jun. 15, 2018, 27 pages.
Weninger et al. "Speech enhancement with LSTM recurrent neural networks and its application to noise-robust ASR," International Conference on Latent Variable Analysis and Signal Separation, Aug. 25, 2015, 10 pages.

(56) References Cited

OTHER PUBLICATIONS

Yu et al. "Permutation invariant training of deep models for speaker-independent multi-talker speech separation," arXiv 1607.00325v2, Jan. 3, 2017, 5 pages.
Zeiler et al. "Visualizing and understanding convolutional networks," ECCV, Sep. 6, 2014, 16 pages.
Zhao et al. "The sound of pixels," ECCV, Sep. 2018, 17 pages.
Zhou et al. "Object detectors emerge in deep scene cnns," arXiv 1412.6856v2, Apr. 15, 2015, 12 pages.

* cited by examiner

AUDIO-VISUAL SPEECH SEPARATION

CROSS-REFERENCE TO RELATED APPLICATIONS

This application claims priority to Provisional Application No. 62/590,190, filed on Nov. 22, 2017, the entire contents of which are incorporated herein by reference.

BACKGROUND

This specification relates to a system and methods for training and using a neural network to perform automatic speech separation.

Neural networks are machine learning models that employ one or more layers of nonlinear units to predict an output for a received input. Some neural networks include one or more hidden layers in addition to an output layer. The output of each hidden layer is used as input to the next layer in the network (i.e., the next hidden layer or the output layer). Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term memory (LSTM) neural network that includes one or more LSTM memory blocks. Each LSTM memory block can include one or more cells that each include an input gate, a forget gate, and an output gate that allow the cell to store previous states for the cell (e.g., for use in generating a current activation or to be provided to other components of the LSTM neural network). A bidirectional LSTM neural network is an LSTM neural network in which each LSTM memory block includes one or more cells that can store future states as well as previous states for the cell. That is, when processing a given input from the input sequence, the bidirectional LSTM neural network uses context from both inputs before the given input and after the given input in the input sequence.

Some neural networks are convolutional neural networks that include one or more convolutional layers. Convolutional layers are generally sparsely-connected neural network layers. That is, each node in a convolutional layer receives an input from a portion of (i.e., less than all of) the nodes in the preceding neural network layer or, if the convolutional layer is the lowest layer in the sequence, a portion of an input to the neural network, and produces an activation from the input. Generally, convolutional layers have nodes that produce an activation by convolving received inputs in accordance with a set of weights for each node, referred to as a filter. In some cases, nodes in a convolutional layer may be configured to share filters. That is, all of or a portion of the nodes in the layer may be constrained to always have the same weight values as the other nodes in the layer.

A dilated convolutional neural network is a convolutional neural network that convolves larger portions of the received inputs at once, by modifying the convolution operator of the nodes to apply the filter to the input at different ranges, depending on the dilation factor. For example, a dilated convolution of an input image represented by pixels convolves pixels farther apart from each than a typical convolution of the same image. Compared to nodes in a convolutional neural network, nodes in a dilated convolutional neural network having a given sized filter convolve larger portions of the input at once than do nodes having the same sized filter in a standard convolutional layer.

SUMMARY

This specification describes a system implemented as computer programs on one or more computers in one or more locations that receives an input video of one or more speakers speaking and produces an isolated speech signal for each speaker, in which only the speech of the respective speaker can be heard.

According to an aspect, there is provided a method comprising: obtaining, for each frame in a stream of frames from a video in which faces of one or more speakers have been detected, a respective per-frame face embedding of the face of each speaker; processing, for each speaker, the per-frame face embeddings of the face of the speaker using a video convolutional neural network to generate visual features for the face of the speaker; obtaining a spectrogram of an audio soundtrack for the video; processing the spectrogram using an audio convolutional neural network to generate an audio embedding for the audio soundtrack; combining the visual features for the one or more speakers and the audio embedding for the audio soundtrack to generate an audio-visual embedding for the video; determining, from the audio-visual embedding for the video, a respective spectrogram mask for each of the one or more speakers; and determining, from the respective spectrogram masks and the corresponding audio soundtrack, a respective isolated speech spectrogram for each speaker that isolates the speech of the speaker in the video.

The method may further comprise the following features.

The method may further comprise generating, from the respective isolated speech spectrogram for a particular one of the one or more speakers, an isolated speech signal for the particular speaker.

Obtaining the respective per-frame face embeddings may comprise: obtaining the video comprising the stream of frames; detecting, in each frame of the stream of frames, a respective face of each of one or more speakers; and generating, for each frame, a respective per-frame face embedding for each of the detected faces.

Combining the visual features for the one or more speakers and the audio embedding for the audio soundtrack to generate an audio-visual embedding for the video may comprise: concatenating the visual features for the one or more speakers and the audio embedding for the audio soundtrack to generate the audio-visual embedding for the video.

Determining from the audio-visual embedding for the video, a respective mask for each of the one or more speakers may comprise: processing the audio-visual embedding for the video using a masking neural network, wherein the masking neural network is configured to: process the audio-visual embedding for the video to generate a respective spectrogram mask for each of the one or more speakers.

Optionally, the masking neural network includes one or more long short-term memory (LSTM) layers followed by one or more other neural network layers.

Optionally, the one or more other neural network layers include one or more fully connected layers.

Optionally, the one or more LSTM layers are bidirectional LSTM layers.

The method may further comprise for each of one or more of the speakers, processing the isolated speech spectrogram for the speaker or data derived from the isolated speech spectrogram for the speaker using an automatic speech recognition (ASR) model to generate a transcription of the speech of the speaker in the video.

According to an aspect, there is provided a method of training a video convolutional neural network, an audio convolutional neural network, and a masking neural network, the method comprising: obtaining training data comprising a plurality of training examples, each training example comprising (i) a respective training video and (ii) a ground truth isolated speech spectrogram of the speech of each of one or more speakers in the respective training video; and training the video convolutional neural network, the audio convolutional neural network, and the masking neural network on the training data.

The method may further comprise the following optional features.

Obtaining the training data may comprise, for each of the training examples: obtaining, for each of one or more speakers, a clean video of the speaker speaking and a corresponding clean audio soundtrack of speech of the speaker from the clean video; generating, from at least the clean video and corresponding clean audio soundtrack of the one or more speakers, a mixed video and a mixed audio soundtrack; and generating the training example by associating the mixed video with, for each of the one or more speakers, a spectrogram corresponding to the respective clean audio soundtrack of the speech of the speaker.

Optionally, each training example comprises (i) a respective training video of a single speaker and (ii) a ground truth isolated speech spectrogram of the speech of the single speaker in the respective training video, and generating the mixed video and the mixed audio soundtrack may comprise augmenting the clean audio soundtrack of the speech of the single speaker with noise.

Optionally, each training example comprises (i) a respective training video of a plurality of speakers and (ii) a respective ground truth isolated speech spectrogram of the speech of each of the plurality of speakers in the respective training video; and generating the mixed video with the mixed audio soundtrack may comprise mixing the training video for the plurality of speakers and mixing the respective clean audio soundtracks of the plurality of speakers.

Generating the mixed video and the mixed audio soundtrack may comprise augmenting the mixed audio soundtracks of the speech of the plurality of speakers with noise.

Optionally, the video convolutional neural network comprises a set of weights, and processing for each speaker, the per-frame face embeddings of the face of the speaker using the video convolutional neural network to generate visual features for the face of the speaker may comprise: processing for each speaker, the per-frame face embeddings of the face of the speaker using the video convolutional neural network to generate visual features for the face of the speaker using the set of weights.

Optionally, the audio soundtrack of the video further comprises background noise, and the method may further comprise: determining, from the audio-visual embedding for the video, a background noise spectrogram mask for the background noise.

Determining, from the respective masks and the corresponding audio soundtrack, a respective isolated speech signal for each speaker that isolates the speech of the speaker in the video may comprise: masking the background noise of the corresponding audio soundtrack with the background noise spectrogram mask.

Optionally, the respective spectrogram masks for each of the one or more speakers is a complex ideal ratio mask, the complex ideal ratio mask having a separately estimated real component and imaginary component.

Optionally, the audio convolutional neural network is an audio dilated convolutional neural network.

Optionally, the video convolutional neural network is a video dilated convolutional neural network.

As will be appreciated, the methods described above may be implemented by a system comprising one or more computers and one or more storage devices storing instructions that when executed by the one or more computers cause the one or more computers to perform the respective operations of the preceding methods.

The subject matter described in this specification can be implemented in particular implementations so as to realize one or more of the following advantages. By incorporating both audio and visual features of a speaker, audio separation quality of the system is improved over audio-only speech separation models (i.e., models that only receive audio as an input). Additionally, the disclosed system is able to label speech of different speakers from a common source more efficiently than audio-only models (i.e., the system assigns an isolated speech signal to the face of a respective speaker automatically while generating respective isolated speech signals for the speakers).

The system is speaker-independent, meaning that the system can be trained with training examples of a set of speakers and then receive, at inference, an input video of completely different speakers to produce an isolated speech signal for each speaker.

The system can be applied to a variety of videos where clean audio of a particular speaker is desired but no assumption is made about the visibility of each speaker's face. For example, the system can receive a video of a speaker speaking with an accompanying "dub" of another, off-screen speaker, speaking over the speaker. The system can generate an isolated speech signal of the speaker in the video, as well as produce an isolated speech signal of the off-screen speaker. The system also robustly isolates speech for multiple speakers of the same gender and speakers with similar sounding voices.

The system can also process videos for automatic speech recognition and video transcription (i.e., creating a transcript for speech in a video that identifies the respective speakers). The system generates video transcriptions that are easier to read and contain fewer errors over traditional approaches. Additionally, the system can improve an ASR system by first isolating the speech of the desired speaker, as described in this specification.

Additionally, the system at inference receives an input video of arbitrary length and arbitrary number of speakers—with or without additional background noise—to produce respective isolated speech signals for the speakers. The system can process input videos that were not recorded with speech separation in mind (e.g., videos recorded without separate microphones for each speaker, or without prior knowledge that the video will be processed for automatic speech separation). The system can also perform effectively on incomplete video input (i.e., videos with missing frames or with frames that have no valuable information e.g., because the face of a speaker is occluded or blurred from head motion). As a result, the system is more robust because of its applicability to real-world examples.

Additionally, the system can be trained to process videos representing a variety of different speech tasks, by altering how training examples are generated by one or more implementations of the disclosed subject matter. For example, the system can be trained to generate respective isolated speech signals from training examples of videos of one or more speakers, with or without background noise.

Additionally, the system can be trained to recognize the speech of a particular speaker in an input video and generate an isolated speech signal more efficiently and more accurately than models trained for general speech separation.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Automatic speech separation is the problem of separating an audio soundtrack of speech of one or more speakers into isolated speech signals of each respective speaker, to either enhance the speech of a particular speaker or to mask the speech of other speakers so that only a particular speaker is heard. The audio soundtrack may be accompanied by a corresponding video of one or more of the respective speakers.

The audio soundtrack may be of one speaker (called a "clean" audio soundtrack) or of one or more speakers (called a "noisy" audio soundtrack). A noisy soundtrack can also include additional background noise. Background noise is any sound not from the speech of the one or more speakers (e.g., audience applause, music, or ambient environmental sounds). The adjectives "clean" and "noisy" in this specification are applied also to describe spectrograms (e.g., a clean spectrogram is a spectrogram of a clean audio soundtrack, and a noisy spectrogram is a spectrogram of a noisy audio soundtrack) and videos (e.g., a clean video is a video with a clean soundtrack, and a noisy video is a video with a noisy audio soundtrack).

This specification generally describes a system that can isolate or enhance the speech signal of one or more speakers from an audio soundtrack and corresponding video data (i.e., the system executes an audio speech separation task). How the system is trained and how the system processes the input video and audio soundtrack to execute the task depends on how the audio speech separation task is defined. The task is defined based on how many speakers are speaking and whether or not there is background noise in the input audio soundtrack (e.g., 1 speaker+noise, 2 clean speakers, or 2 speakers+noise).

Figure 1:
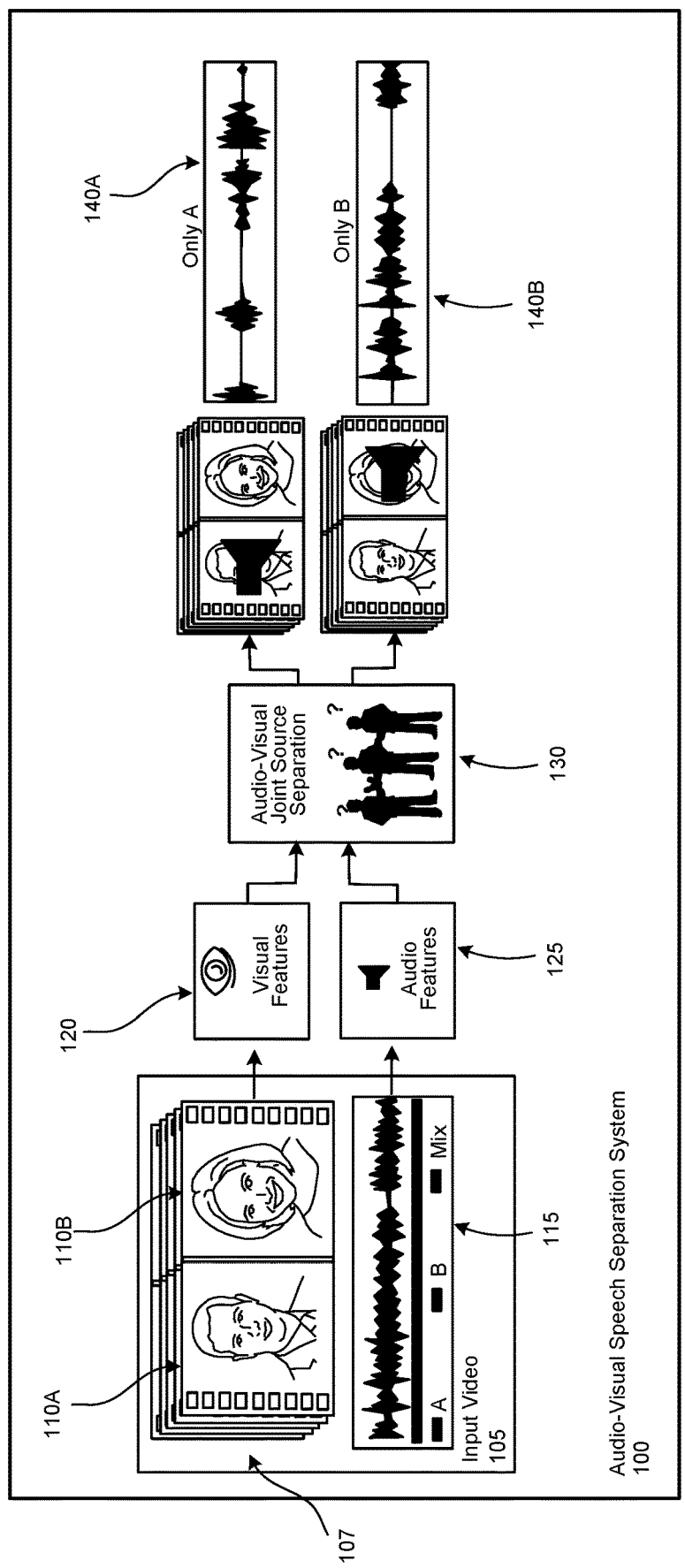
FIG. 1 is a diagram of an audio-visual speech separation system.

FIG. 1 is a diagram of an audio-visual speech separation system 100. The system 100 is an example of a system implemented as computer programs on one or more computers in one or more locations, in which the systems, components, and techniques described below can be implemented.

In general, the system 100 processes an input video of one or more speakers to generate isolated speech signals for each speaker, from joint audio-visual features of each speaker. The system 100 generates the joint audio-visual features for each speaker from the respective separately processed audio and visual features, before processing the joint audio-visual features through a masking neural network.

The masking neural network generates a spectrogram mask for each speaker, which the system 100 applies to a spectrogram of the audio soundtrack, generating a respective separated spectrogram for each speaker. The system 100 outputs an isolated speech signal from the separated spectrogram.

Depending on what the audio speech separation task is for the system 100, a training system generates training examples of videos and accompanying soundtracks from a dataset of clean videos by "mixing" the clean videos to obtain mixed videos reflecting the audio speech separation task and uses the training examples to train the system 100. Discussion follows below regarding how the system 100 processes the input video and how the training system generates task-appropriate training examples.

The system 100 receives a video 105 of one or more speakers. Generally, the video has a (i) stream of frames containing faces of one or more of the speakers and (ii) an accompanying audio soundtrack of the speakers speaking in the video, as well as possible background noise. In the example of FIG. 1, the video 105 has a stream of frames 107 containing the respective faces of a speaker A 110A and a speaker B 110B, as well as an audio soundtrack 115 containing the speech of speakers 110A-B.

The system 100 processes the video 105 using an audio stream and a visual stream. In the visual stream, the system 100 extracts visual features 120 from the stream of frames 107 for the respective speakers 110A-B in the video 105. Visual features are characteristics of the speaker's face while speaking. For example, visual features can be the shape of the mouth, eyes, and cheeks of the face of the speaker.

The system 100 resamples the video 105 to a pre-determined number of frames-per-second (FPS) (e.g., 25 FPS). The system 100 removes or replicates face embeddings depending on if the video 105 is up-sampled or down-sampled. In some implementations, the system 100 performs additional operations to align and assess the quality of the per-frame face embeddings, discussed below.

In the audio stream, the system 100 extracts audio features 125 from the audio soundtrack 115 for the respective speakers 110A-B in the video 105. Audio features 125 are characteristics of the speech of a speaker. The system 100 extracts audio features 125 by computing the short-time Fourier transform (STFT) of fixed length (e.g., 3 seconds) segments of the audio soundtrack 115 to generate a spectrogram for the audio soundtrack 115. In particular, the system 100 computes a plurality of time-frequency bins for the audio soundtrack, each time-frequency bin representing audio features (e.g., the frequency of the audio soundtrack) for one of the fixed-length segments of the audio soundtrack. The time-frequency bins are represented by a real component and a complex component.

A spectrogram is a representation of the frequencies of the audio soundtrack. Specifically, a spectrogram represents at a given time, the corresponding frequency of the audio soundtrack, represented by the components of the time-frequency bins obtained when the system 100 computed the STFT of the fixed-length segments of the audio soundtrack.

The system 100 processes the spectrogram of the audio soundtrack 115 to generate an audio embedding for the audio soundtrack 115. An embedding is an ordered collection of numeric values (e.g., a vector of floating point or quantized floating point values). An audio embedding represents audio features of an audio soundtrack, e.g., the audio embedding stores the audio features 125 extracted from the audio soundtrack 115.

The system 100 combines the visual features 120 and the audio features 125 of the video 105 to obtain joint audio-visual embeddings 130 of the video 105. A joint audio-visual embedding represents both audio features of a soundtrack and visual features of a face. In some implementations, the system 100 generates joint audio-visual embeddings 130 of the video 105 by concatenating the audio features 125 with the visual features 120 for the respective video 105. The system 100 generates, from the processed audio-visual embeddings 130 of the video 105, an isolated speech signal 140A for speaker A 110A and an isolated speech signal 140B for speaker B 110B.

Figure 2:
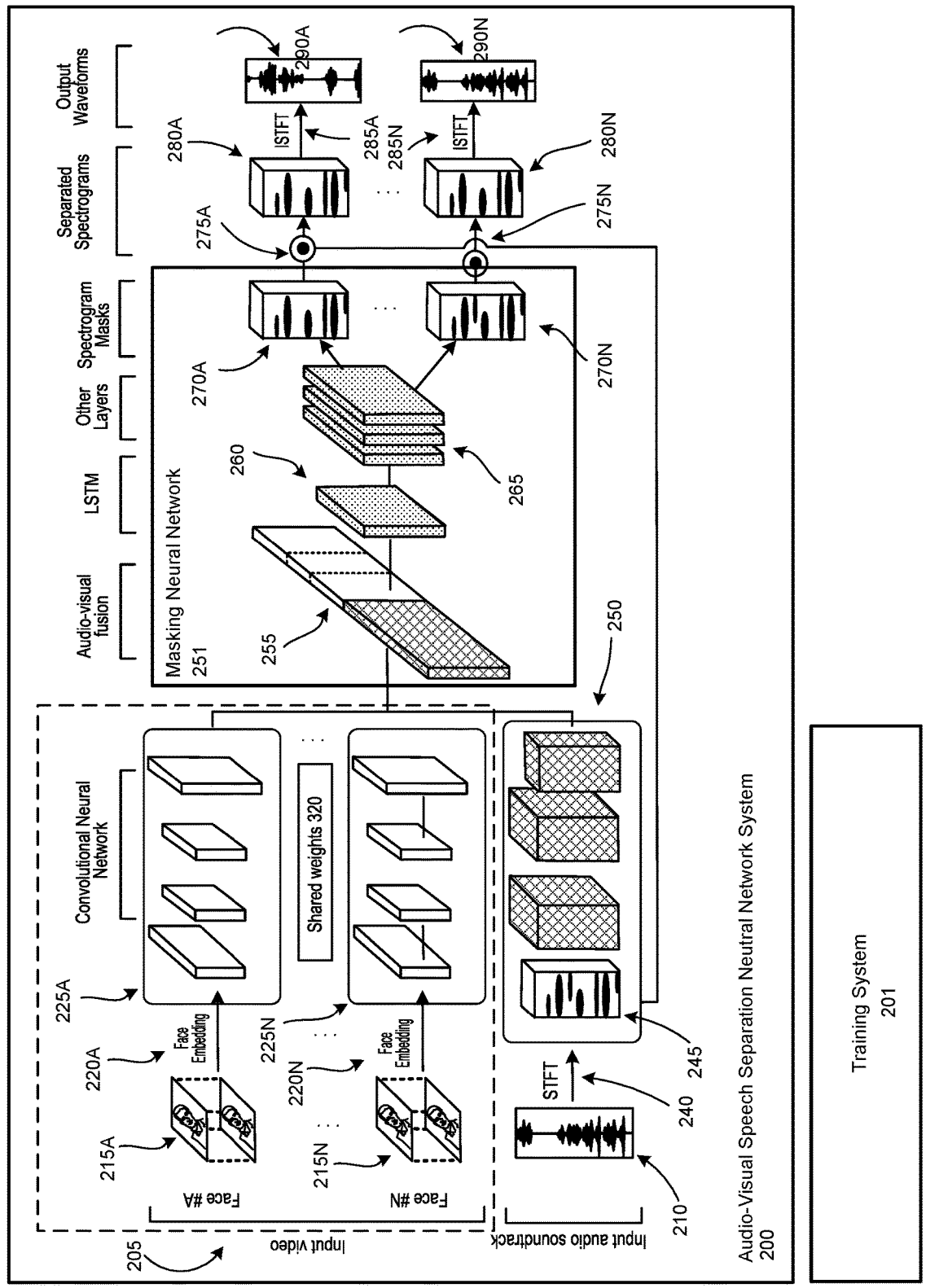
FIG. 2 is a diagram of an audio-visual speech separation neural network system and a training system for training the audio-visual speech separation neural network system.

FIG. 2 is a diagram of an audio-visual speech separation neural network system 200 and a training system 201 for training the audio-visual speech separation neural network system 200. The system 200 is an exemplary implementation of the system 100 for processing videos of N visible speakers 215A-N, where N is a fixed integer. Neural network systems (e.g., the neural network system 200) are configured to process videos for a predetermined number of speakers, either with or all without background noise. For example, the neural network system 200 is configured to process videos of N visible speakers, without background noise. Alternatively, the neural network system 200 could be configured to process videos of N visible speakers, with background noise. As another alternative, the neural network system 200 could be configured to process videos of M visible speakers, M≠N.

The training system 201 trains the neural network system 200 on training examples. Specifically, the training system 201 configures the neural network system 200 by training the neural network system 200 on training examples which are videos of a predetermined number of speakers, either with or all without background noise. The speakers in the training examples can vary by person or language from example to example.

Training in this specification refers to the training system 201 modifying the weights of the neural network system 200 in response to comparing: (i) separated spectrograms for each speaker obtained by applying a respective predicted spectrogram mask generated by the system 200 to a spectrogram of the audio soundtrack of the training example, with (ii) respective ground truth clean spectrograms of the speakers in the training example.

The training system 201 generates training examples for the neural network system 200 by mixing clean videos from a clean video dataset depending on the desired configuration of the neural network system 200. A detailed description of how the training system 201 generates the training examples and trains the neural network system 200 is given below with reference to FIG. 4.

The system 200 receives a video 205 with a corresponding input audio soundtrack 210 of N visible speakers 215A-N speaking. For each speaker 215A-N in the input video 205, the system 200 generates respective per-frame face embeddings 220A-N for each frame of the video. Face embeddings represent visual features of a face while removing irrelevant features that vary between each frame, such as illumination of the speaker's face. Alternatively, visual features of a speaker can be represented by the raw pixels of the frames containing the respective speaker.

In some implementations, the system 200 extracts visual features by first using a trained face-recognition model (e.g., Google Cloud Vision API) to extract one face embedding per frame for each detected face in the video 205.

The system 200 processes the per-frame face embeddings 220A-N for each speaker through a respective video convolutional neural network 225A-N (e.g., the system 200 processes the per-frame face embeddings 220A of speaker A 215A through the video convolutional neural network A 225A) to generate visual features for the speaker.

In some implementations, the video convolutional neural networks 225A-N are the same neural network (i.e., the video convolutional neural networks 225A-N share a set of shared weights 230). In some implementations, the video convolutional neural networks 225A-N are dilated video convolutional neural networks.

An exemplary dilated video convolutional neural network architecture is described in TABLE 1, below:

TABLE 1

|  | conv1 | conv2 | conv3 | conv4 | conv5 | conv6 |
|---|---|---|---|---|---|---|
| Num Filters | 256 | 256 | 256 | 256 | 256 | 256 |
| Filter Size | 7 × 1 | 5 × 1 | 5 × 1 | 5 × 1 | 5 × 1 | 5 × 1 |
| Dilation | 1 × 1 | 1 × 1 | 2 × 1 | 4 × 1 | 8 × 1 | 16 × 1 |
| Context | 7 × 1 | 9 × 1 | 13 × 1 | 21 × 1 | 37 × 1 | 69 × 1 |

TABLE 1 shows the number of layers (shown as "conv1"-"conv6") as well as the number of filters per layer, size of the filters per layer, dilation factor of the filters, and the size of the context vector at each layer. It is understood that the architecture described in TABLE 1 is exemplary and that the video convolutional neural networks 225A-N can be designed to have an arbitrary amount of layers, with each layer having: any number of filters, any size filter, any dilation factor, and any size context vector (including no context vector at all).

The system 200 computes the STFT 240 on the input audio soundtrack 210 to generate a spectrogram 245. The system 200 processes the spectrogram 245 through an audio convolutional neural network 250 to obtain audio embeddings of the input audio soundtrack 210. In some implementations, the audio convolutional neural network 250 is a dilated audio convolutional neural network.

An exemplary dilated audio convolutional neural network architecture is described in TABLE 2, below:

TABLE 2

|  | conv1 | conv2 | conv3 | conv4 | conv5 | conv6 | conv7 | conv8 |
|---|---|---|---|---|---|---|---|---|
| Num Filters | % | % | % | % | % | % | % | % |
| Filter Size | 1 × 7 | 7 × 1 | 5 × 5 | 5 × 5 | 5 × 5 | 5 × 5 | 5 × 5 | 5 × 5 |
| Dilation | 1 × 1 | 1 × 1 | 1 × 1 | 2 × 1 | 4 × 1 | 8 × 1 | 16 × 1 | 32 × 1 |
| Context | 1 × 7 | 7 × 7 | 9 × 9 | 13 × 11 | 21 × 13 | 37 × 15 | 69 × 17 | 133 × 19 |

TABLE 2-continued

|  | conv9 | conv10 | conv11 | conv12 | conv13 | conv14 | conv15 |
|---|---|---|---|---|---|---|---|
| Num Filters | % | % | % | % | % | % | % |
| Filter Size | 5 × 5 | 5 × 5 | 5 × 5 | 5 × 5 | 5 × 5 | 5 × 5 | 1 × 1 |
| Dilation | 1 × 1 | 2 × 2 | 4 × 4 | 8 × 8 | 16 × 16 | 32 × 32 | 1 × 1 |
| Context | 135 × 21 | 139 × 25 | 147 × 33 | 163 × 49 | 195 × 81 | 259 × 145 | 259 × 145 |

As with the exemplary dilated video convolutional neural network architecture described in TABLE 1, above, it is understood that the dilated audio convolutional neural network can be designed with a variety of configuration options.

The system 200 combines (e.g., concatenates) the output visual features from the video convolutional neural networks 225A-N and the output audio embedding from the audio convolutional neural network 250 to generate joint audio-visual embeddings 255. In some implementations, the system 200 compensates for a sampling rate discrepancy between the audio and the visual stream by up-sampling the output of the visual stream to match the spectrogram sampling rate (e.g., the system 200 uses nearest neighbor interpolation in the temporal dimension for each visual feature). In some implementations, the joint audio-visual embeddings 255 are represented as joint audio-visual embeddings.

In some implementations, the system 200 combines the per-frame face embeddings 220A-N with the spectrogram 245 before doing any processing through the respective visual and audio convolutional neural networks. In those implementations, the system 200 processes the per-frame face embeddings 220A-N using one or more fully connected layers to reduce the dimensionality of each per-frame face embedding to match the spectrogram dimension at each time-step. Then, the system 200 stacks the resulting per-frame face embeddings as a third spectrogram stream and processes the face embeddings 220A-N jointly.

In some implementations, after each convolutional neural network layer in the audio convolutional neural network and the video convolutional neural networks, the neural network system 200 performs batch normalization.

The system 200 includes a masking neural network 251. In some implementations, the masking neural network 251 includes a long short-term memory (LSTM) neural network 260 and one or more additional neural network layers 265. In some implementations, the LSTM neural network 260 is a bidirectional LSTM neural network. In some implementations, the one or more additional neural network layers 265 are fully connected layers.

An activation function (e.g., ReLU or sigmoid) follows some or all of the neural network layers in the neural network system 200. In some implementations, the activation function for the last layer (i.e., the layer that outputs the spectrogram masks, discussed below) in the masking neural network 251 is a sigmoid.

The system 200 processes the joint audio-visual embeddings 255 through the masking neural network 251 to obtain respective spectrogram masks 270A-N for each speaker 215A-N. In some implementations, if the audio soundtrack 210 contains background noise, the system 200 additionally generates a background noise spectrogram mask.

A spectrogram mask describes the time-frequency relationships between clean speech for a speaker and background interference (i.e., noise and the speech of other speakers) in a spectrogram of an audio soundtrack. Specifically, a spectrogram mask for a speaker is a set of values (represented by real and, optionally, complex components) that can be applied (e.g., by multiplication) on a spectrogram at each time-frequency bin, to modify the spectrogram at that time-frequency bin to represent only the frequency of the speech of the speaker (e.g., by masking out parts of the frequency at that time-frequency bin associated with other speakers, or background noise). A background noise mask is a set of values that similarly can be applied on a spectrogram, but for the purpose of masking out parts of the frequency of each time-frequency bin associated with the background noise (i.e., a background noise mask applied to a spectrogram removes background noise from the spectrogram after the spectrogram is converted back to an audio signal).

For example, the system 200 applies spectrogram mask 270A to the spectrogram 245 (e.g., by multiplication) to generate a separated spectrogram A 280A (shown as operator 275A in FIG. 2). The separated spectrogram A 280A is a spectrogram of an audio soundtrack where only speaker A 215A is heard (i.e., a separated spectrogram for a speaker is an isolated speech spectrogram that isolates the speech of the speaker in the video).

In some implementations, the spectrogram masks 270A-N are ideal ratio masks. An ideal ratio mask defines the ratio between the magnitudes of a separated spectrogram and the spectrogram 245. In some implementations, the spectrogram masks 270A-N are complex ideal ratio masks. A complex ideal ratio mask is an ideal ratio mask with a real component and an imaginary component, separately estimated in the real domain. In some implementations where the spectrogram masks 270A-N are complex ideal ratio masks, the system 200 applies sigmoidal compression to bound mask values.

The system 200 converts the separated spectrograms 280A-N to respective isolated output waveforms 290A-N. If the separated spectrogram masks 270A-N are ideal ratio masks, then the system 200 converts the separated spectrograms 280A-N by computing the inverse short-term Fourier transform 285A-N (ISTFT) on the point-wise multiplication of the respective separated spectrogram mask and the spectrogram 245, combined with the original phase of the spectrogram 245. If the separated spectrogram masks 270A-N are complex ideal ratio masks, the system 200 converts the separated spectrograms 280A-N by computing the ISTFT 285A-N on the complex multiplication of the respective spectrogram mask and the spectrogram 245.

The isolated output waveforms 290A-N represent isolated sound signals for each respective speaker.

Once generated, the system 200 can use the isolated output waveforms 290A-N to play back to a user, the speech of at least one speaker in the input video 205. As another example, the system 200 can use the isolated output waveforms 290A-N to play back the input video 205 without background noise. The isolated output waveforms 290A-N can be labeled and processed as input in an audio-transcription system (i.e., the audio soundtrack 210 and the isolated output waveforms 290A-N are input to an audio-transcription system, and the audio-transcription system generates, as output, a transcription of the audio soundtrack 210). Audio transcriptions can additionally be used to generate subtitles for the input video 205, for each speaker.

As another example, the system 200 can use the isolated output waveforms 290A-N to remove speech dubbed over a visible speaker in the input video 205 (e.g., by playing back only the isolated output waveform for the visible speaker). Similarly, the system 200 can use the isolated output waveforms 290A-N to play back to the user only the dubbed speech of the not-visible speaker (e.g., by not playing back the isolated output waveform of the speech of the visible speaker, and instead playing back the other isolated output waveforms).

As another example, the system 200 can use the isolated output waveforms 290A-N to enhance the speech of one or more of the speakers 215A-N in the input video 205 (e.g., by increasing the volume of one or more of the speakers 215A-N over the other speakers).

Figure 3:
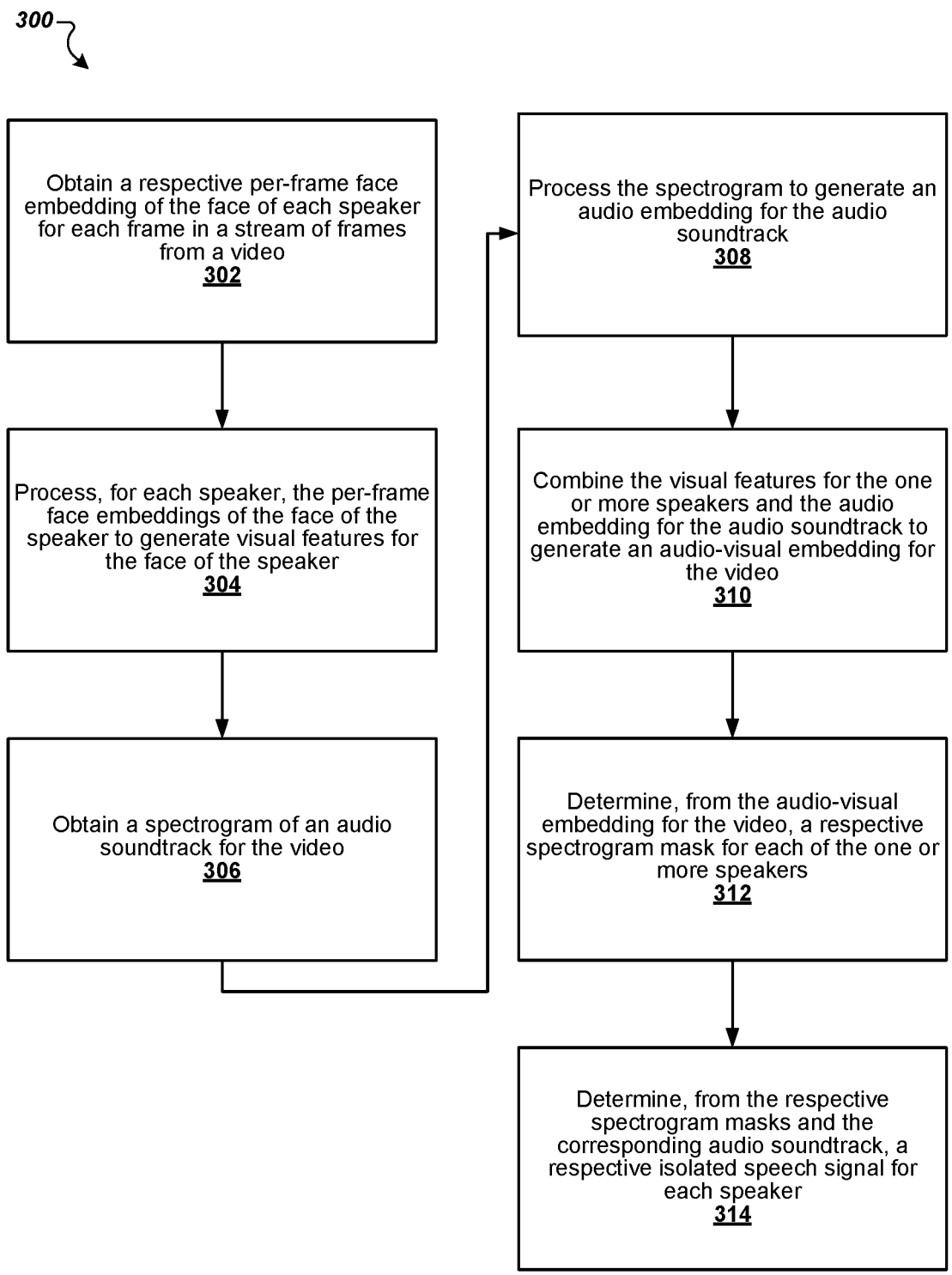
FIG. 3 is a flow chart of an example process for determining, from an input video of one or more speakers, an isolated speech signal for each speaker.

FIG. 3 is a flow chart of an example process 300 for determining, from an input video of one or more speakers, an isolated speech signal for each speaker. For convenience, the process 300 will be described as being performed by a system of one or more computers located in one or more locations. For example, an audio-visual source speech separation neural network system (e.g., the audio-visual source speech separation neural network system 200 of FIG. 2) appropriately programmed in accordance with this specification, can perform the process 300. Additional detail for implementing a system that performs the process 300 can be found in the description of FIG. 2, above.

The system obtains a respective per-frame face embedding of the face of each speaker for each frame in a stream of frames from a video (step 302). As described above with reference to FIG. 2, the system can receive a video with an accompanying audio soundtrack, and generate the per-frame face embedding for each speaker in the video.

The system processes, for each speaker, the per-frame face embeddings of the face of the speaker to generate visual features for the face of the speaker (step 304). As described above with reference to FIG. 2, the system can process the per-frame face embeddings through a video convolutional neural network, where the video convolutional neural network generates respective visual features for each speaker.

The system obtains a spectrogram of an audio soundtrack for the video (step 306). As described above with reference to FIG. 2, the system can compute the STFT of the audio soundtrack to generate the spectrogram of the audio soundtrack from the computed time-frequency bins.

The system processes the spectrogram to generate an audio embedding for the audio soundtrack (step 308). As described above with reference to FIG. 2, the system can process the spectrogram of the audio soundtrack through an audio convolutional neural network, where the audio convolutional neural network generates an audio embedding for the audio soundtrack The system combines the visual features for the one or more speakers and the audio embedding for the audio soundtrack to generate an audio-visual embedding for the video (step 310). As described above with reference to FIG. 2, the system can combine the audio embedding generated by the audio convolutional neural network with the visual features for each speaker generated by the video convolutional neural networks to generate an audio-visual embedding for the video.

The system determines, from the audio-visual embedding for the video, a respective spectrogram mask of the one or more speakers (step 312). As described above with reference to FIG. 2, the system can process the audio-visual embedding for the video through a masking neural network, where the masking neural network generates a respective spectrogram mask for the one or more speakers.

The system determines, from the respective spectrogram masks and the corresponding audio soundtrack, a respective isolated speech signal for each speaker (step 314). As described above with reference to FIG. 2, the system can apply the respective spectrogram mask for each speaker to the spectrogram of the audio soundtrack. Then, the system can apply the ISTFT on the respective separated spectrograms to generate isolated output waveforms for each speaker.

As described above, the system is configured to receive data for a fixed number of speakers and to generate a fixed number of spectrogram masks. In some cases the spectrogram masks include a respective mask for each of the speakers, while in other cases the spectrogram masks also include a background noise mask for background noise.

A training system (e.g., the training system 201 of FIG. 2) appropriately configured in accordance with this specification, generates training examples and trains the neural network system on the training examples to process data for a fixed number of speakers.

The training examples are mixed videos with corresponding mixed audio soundtracks that are "mixed" from a dataset of clean videos of single visible speakers speaking. How the training system generates training examples for training the neural network system is discussed in detail, below.

Each training example is additionally associated with a set of respective clean spectrograms for each clean video used in generating the mixed video. For example, if a training example contains a mixed video mixed from two clean videos, then the training example is additionally associated with two clean spectrograms, one taken from the audio soundtrack of each clean video. The clean spectrograms form the basis of comparison (i.e., the ground truth) with predicted separated spectrograms generated using predicted spectrogram masks the system generates for each speaker.

The system compares the clean spectrograms with the predicted separated spectrograms to calculate a loss function of the neural network system. The system uses the loss function to update the weights of the system (e.g., by backpropagation, discussed below).

The training examples are typically a few seconds long (e.g., between 3 to 10 seconds). The training examples reflect the task the training system is training the neural network system to perform. For example, if the neural network system is being trained to process videos of two visible speakers speaking without background noise, then the training examples are videos of two visible speakers speaking without background noise.

Figure 4:
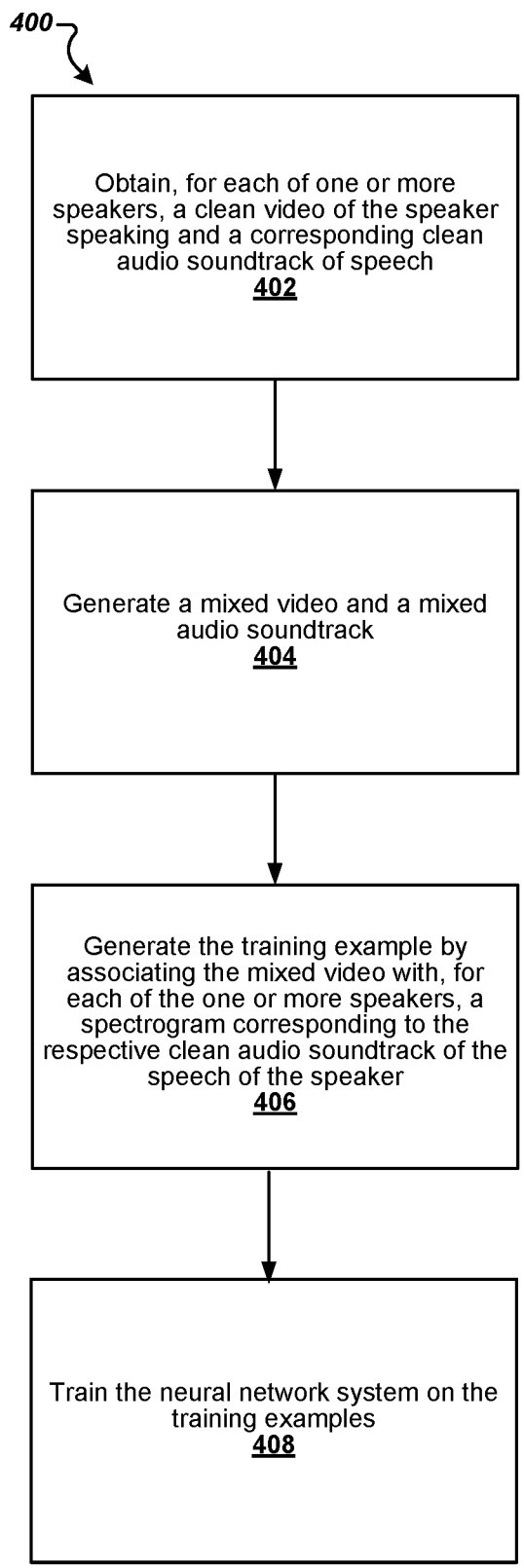
FIG. 4 is a flow chart of an example process of generating training examples for training the audio-visual speech separation neural network system.

The neural network system receives training examples in batches (e.g., a batch size of 6 training examples). The system re-samples the training examples to a fixed frame rate (e.g., 25 FPS). The system re-samples the audio for all training examples to a set frequency (e.g., 16 KHz). FIG. 4 is a flow chart of an example process 400 of generating training examples for training the audio-visual speech separation neural network system. For convenience, the process 400 will be described as being performed by a training system of one or more computers located in one or more locations. For example, a training system (e.g., the training system 201 of FIG. 2) appropriately programmed in accordance with this specification, can perform the process 400.

The training system obtains, for each of one or more speakers, a clean video of the speaker speaking and a corresponding clean audio soundtrack of speech (step 402).

For example, the training system obtains clean videos from a dataset of videos, where each video is of a single visible speaker speaking. Additionally, in some implementations, the dataset of videos includes face bounding boxes per frame of video, to assist in extracting visual features for the speaker.

In some implementations, the videos in the dataset are pre-recorded with the purpose of generating training examples in mind (e.g., the videos are recorded without background noise, with a clearly visible speaker, and where only the speaker is speaking).

In some implementations, clean videos for the dataset are generated from a collection of raw videos of speakers speaking that were not recorded with the generation of training examples in mind. The collection of raw videos can be videos freely available (e.g., videos uploaded to the internet) and of arbitrary length. In some implementations, the collection of raw videos includes videos that are generally of a single speaker speaking (e.g., lecture videos or "how-to" tutorial videos). Raw videos used to generate clean videos for the training examples can vary in the people, languages, and face poses recorded in the raw videos.

In some implementations, the training system obtains clean videos from raw videos automatically, resulting in a larger training set that is less expensive to obtain versus a dataset of videos recorded with prior knowledge of use in generating training examples.

In implementations where the training system obtains clean videos of respective speakers speaking from a collection of raw videos, the training system must perform pre-processing on the raw videos. For each raw video, the training system splits the raw video into non-overlapping video segments (e.g., 3 second segments) and uses a speaker tracking method (e.g., the method of Hoover, et. al.) to detect a speaker actively speaking with his or her face visible in the video segment.

For each frame in a video segment, the training system analyzes and discards frames unfit for training (e.g., the training system discards frames where a speaker's face is blurred, insufficiently illuminated, or has an extreme facial pose). If the training system discards over a certain percentage threshold (e.g., 15%) of frames in a video segment, then the training system discards the whole video segment.

The training system additionally discards video segments with interfering sounds (i.e., the training system discards video segments so only clean video segments remain). The training system determines which video segments are clean video segments by estimating the signal-to-noise ratio (SNR) of each video segment. As applied to the video segments, the SNR is the log ratio of the speech in the video segment and the rest of the audio in the video segment (e.g., background noise or other speakers).

In some implementations, the training system estimates the SNR for each video segment using an SNR estimator, and discards video segments with an SNR below a set threshold. The SNR estimator uses a pre-trained audio-only speech denoising neural network to receive, as input, a video segment with an audio soundtrack, and generate, as output, the estimated SNR for the video segment.

The speech denoising neural network is trained on clean videos of a speaker speaking, augmented with noise, at different SNR levels. Specifically, the speech denoising neural network is trained by comparing the predicted SNR generated by the speech denoising neural network for a given augmented video with the ground truth SNR of the augmented video.

Training the speech denoising neural network also helps to determine an SNR threshold (i.e., the SNR threshold is set based on how accurate the speech denoising network is at estimating the SNR of an input video at different SNR levels).

The training system stores the remaining clean video segments as clean videos.

The training system generates a mixed video and a mixed audio soundtrack (step 404). Step 404 is discussed with regard to generating one mixed video with a mixed audio soundtrack, but it is understood that the training system can repeat step 404 to generate multiple training examples as needed for training (e.g., the training system repeatedly samples from the clean video dataset to obtain one or more clean videos for generating mixed videos and mixed audio soundtracks).

In general, the training system generates a mixed video by combining ("mixing") a plurality of clean videos together. The training system mixes the plurality of clean videos together by extracting, from each clean video, the per-frame face embeddings of the respective speaker in the clean video. The neural network system processes the mixed video in an analogous manner to how the neural network system processes an input video having a plurality of visible speakers, as discussed above.

Specifically, during training, the neural network system processes the mixed video by processing the respective per-frame face embeddings of each speaker in the plurality of clean videos through a respective visual stream, e.g., separate video convolutional neural networks. Alternatively, the neural network system processes the mixed video by processing the respective per-frame face embeddings of each speaker in the plurality of clean videos through a single visual stream, as discussed below. The number of clean videos mixed depends on the speech separation task, with examples below.

Similarly, the training system generates a mixed audio soundtrack by combining ("mixing") the audio soundtracks of a plurality of clean videos. Depending on the speech separation task the neural network system is being trained to perform, the mixed audio soundtrack of the plurality of clean soundtracks is additionally augmented with noise. In some implementations, the soundtrack of the clean video is augmented by noise obtained from a dataset of non-speech background noise (e.g., AudioSet from Gemmeke et al. 2017). Examples for how the training system mixes the audio are discussed below.

In some implementations, the training system mixes videos and audio soundtracks for the respective videos where the speech separation task is one speaker+noise. The training system obtains a clean video of a speaker. The clean video of the speaker is treated as the mixed video, because there is only one speaker. The training system mixes the audio soundtrack for the clean video by a linear combination of the audio soundtrack with additional noise, multiplied by a fixed factor. Mathematically, this is represented as: Mix←CA+ k*Noise, where Mix is the mixed soundtrack obtained by adding the audio soundtrack CA with some noise Noise multiplied by a factor k (e.g., a factor of 0.3).

In some implementations, the training system mixes videos and audio soundtracks for the respective videos where the speech separation task is two clean speakers. The training system obtains a first clean video of a speaker speaking and a second clean video of a speaker speaking, and mixes the first and second video to generate a mixed video of both speakers.

The training system mixes the audio soundtrack for the clean video of the first speaker by adding the audio soundtrack for the clean video of the second speaker, to generate a mixed audio soundtrack. Mathematically, this is represented as: Mix←$CA_1$+$CA_2$, for mixed audio soundtrack Mix and clean audio soundtracks $CA_1$ and $CA_2$.

In some implementations where the speech separation task is more than two clean speakers (e.g., n clean speakers, n>2) the training system can mix video and audio soundtracks by a general variant of how the training system mixes video and audio soundtracks for two speakers, described above. Specifically, the training system obtains n clean videos. The training system generates the mixed video by combining the videos of the n clean videos. The training system generates the mixed audio soundtrack by adding the audio soundtracks of the N clean videos together. Mathematically, this is represented as: Mix←$CA_1$+$CA_2$+ ... +$CA_{n-1}$+$CA_n$, for mixed soundtrack Mix and audio soundtrack for speaker k $CA_k$, k≤n.

In some implementations, the training system mixes videos and audio soundtracks for the respective videos where the speech separation task is two speakers+noise. The training system generates a mixed video as described for the task of 2 clean speakers. The training system generates a mixed audio soundtrack by adding the audio soundtrack for one of the two clean videos to the audio soundtrack for the other clean video, and then adding noise multiplied by a fixed factor. Mathematically, this is represented as: Mix←$CA_1$+$CA_2$+k*Noise, for mixed audio soundtrack Mix, clean audio soundtracks $CA_1$ and $CA_2$, added noise Noise, and factor k.

In some implementations where the speech separation task is more than two speakers+noise, the training system can mix video and audio soundtracks by a generalizing the way in which the training system mixes video and audio soundtracks for N speakers, as discussed above. The training system adds additional noise to the mixed audio soundtrack (e.g., the training system adds noise as described by example, as above). Mathematically, this is represented as: Mix←$CA_1$+$CA_2$+ ... +$CA_{m-1}$+$CA_n$+k*Noise, for mixed soundtrack Mix, audio soundtrack for speaker m $CA_m$, 1≤m≤n, added noise Noise, and factor k.

The training system generates the training example by associating the mixed video with, for each of the one or more speakers, a spectrogram corresponding to the respective clean audio soundtrack of the speech of the speaker (step 406). For example, the training system computes the STFT of the clean audio soundtracks of the clean videos to obtain spectrograms of each respective audio soundtrack.

The training system trains the neural network system on the training examples (step 408). Specifically, the training system updates the weights of the audio convolutional neural network, the video convolutional neural networks, and the masking neural network in accordance with the performance of the neural network system in predicting isolated output waveforms.

The neural network system generates, in the forward pass, a respective predicted spectrogram mask for each speaker in a training example. For neural network systems trained to process videos of a plurality of speakers, in some implementations, the system performs one forward pass for each speaker in a single visual stream to generate a respective predicted spectrogram mask. In some implementations, if the audio soundtrack of the training example contains background noise, the neural network system additionally generates a predicted background noise spectrogram mask used to mask the background noise in the audio soundtrack.

The training system trains the neural network system (i.e., updates the weights of the neural network system by backpropagation) with a loss function (e.g., the squared error between the power-law compressed clean spectrograms associated with the training example and the respective separated spectrogram generated on the forward pass from a predicted spectrogram mask for each speaker in the training example).

In other implementations where the neural network system is trained to process videos of a plurality of speakers, the neural network system has a separate visual stream for each speaker, and performs one forward pass in the visual stream for each speaker to generate a respective predicted spectrogram mask.

During training, the training system reduces the learning rate by one order of magnitude after a certain amount of steps (e.g., the learning rate is reduced every 1.8 million steps).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Implementations of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining, for each frame in a stream of frames from a video in which faces of one or more speakers have been detected, a respective per-frame face embedding of the face of each speaker;
    processing, for each speaker, the per-frame face embeddings of the face of the speaker using a video convolutional neural network to generate visual features for the face of the speaker;
    obtaining a spectrogram of an audio soundtrack for the video;
    processing the spectrogram using an audio convolutional neural network to generate an audio embedding for the audio soundtrack;
    combining the visual features for the one or more speakers and the audio embedding for the audio soundtrack to generate an audio-visual embedding for the video, wherein the audio-visual embedding represents both audio features of the audio soundtrack and visual features of the respective faces of the one or more speakers;
    processing, using a masking neural network, the audio-visual embedding for the video that represents both the audio features of the audio soundtrack and the visual features of the respective faces of the one or more speakers to generate a respective spectrogram mask for each of the one or more speakers, wherein each spectrogram mask describes time-frequency relationships between clean speech for a respective speaker and background interference in a spectrogram of the audio soundtrack; and
    determining, from the respective spectrogram masks and the corresponding audio soundtrack, a respective isolated speech spectrogram for each speaker that isolates the speech of the speaker in the video,
    wherein the video convolutional neural network, the audio convolutional neural network, and the masking neural network are trained end-to-end such that network parameters of the video convolutional neural network, the audio convolutional neural network, and the masking neural network are updated jointly on a same set of training samples.

2. The method of claim 1, further comprising:
    generating, from the respective isolated speech spectrogram for a particular one of the one or more speakers, an isolated speech signal for the particular speaker.

3. The method of claim 1, wherein obtaining the respective per-frame face embeddings comprises:
    obtaining the video comprising the stream of frames;
    detecting, in each frame of the stream of frames, a respective face of each of one or more speakers; and
    generating, for each frame, a respective per-frame face embedding for each of the detected faces.

4. The method of claim 1, wherein combining the visual features for the one or more speakers and the audio embedding for the audio soundtrack to generate an audio-visual embedding for the video comprises:
    concatenating the visual features for the one or more speakers and the audio embedding for the audio soundtrack to generate the audio-visual embedding for the video.

5. The method of claim 1, wherein the masking neural network includes one or more long short-term memory (LSTM) layers followed by one or more other neural network layers.

6. The method of claim 5, wherein the one or more other neural network layers include one or more fully connected layers.

7. The method of claim 5, wherein the one or more LSTM layers are bidirectional LSTM layers.

8. The method of claim 1, further comprising:
    for each of one or more of the speakers, processing the isolated speech spectrogram for the speaker or data derived from the isolated speech spectrogram for the speaker using an automatic speech recognition (ASR) model to generate a transcription of the speech of the speaker in the video.

9. The method of claim 1, wherein the video convolutional neural network comprises a set of weights, and wherein processing for each speaker, the per-frame face embeddings of the face of the speaker using the video convolutional neural network to generate visual features for the face of the speaker comprises:
    processing for each speaker, the per-frame face embeddings of the face of the speaker using the video convolutional neural network to generate visual features for the face of the speaker using the set of weights.

10. The method of claim 1, wherein the audio soundtrack of the video further comprises background noise, the method further comprising:
    determining, from the audio-visual embedding for the video, a background noise spectrogram mask for the background noise.

11. The method of claim 10, wherein determining, from the respective spectrogram masks and the corresponding audio soundtrack, a respective isolated speech signal for each speaker that isolates the speech of the speaker in the video comprises:

masking the background noise of the corresponding audio soundtrack with the background noise spectrogram mask.

12. The method of claim 1, wherein the respective spectrogram masks for each of the one or more speakers is a complex ideal ratio mask, the complex ideal ratio mask having a separately estimated real component and imaginary component.

13. The method of claim 1, wherein the audio convolutional neural network is an audio dilated convolutional neural network.

14. The method of claim 1, wherein the video convolutional neural network is a video dilated convolutional neural network.

15. A system comprising one or more computers and one or more storage devices storing instructions that when executed by the one or more computers cause the one or more computers to perform operations comprising:
   obtaining, for each frame in a stream of frames from a video in which faces of one or more speakers have been detected, a respective per-frame face embedding of the face of each speaker;
   processing, for each speaker, the per-frame face embeddings of the face of the speaker using a video convolutional neural network to generate visual features for the face of the speaker;
   obtaining a spectrogram of an audio soundtrack for the video;
   processing the spectrogram using an audio convolutional neural network to generate an audio embedding for the audio soundtrack;
   combining the visual features for the one or more speakers and the audio embedding for the audio soundtrack to generate an audio-visual embedding for the video, wherein the audio-visual embedding represents both audio features of the audio soundtrack and visual features of the respective faces of the one or more speakers;
   processing, using a masking neural network, the audio-visual embedding for the video that represents both the audio features of the audio soundtrack and the visual features of the respective faces of the one or more speakers to generate a respective spectrogram mask for each of the one or more speakers, wherein each spectrogram mask describes time-frequency relationships between clean speech for a respective speaker and background interference in a spectrogram of the audio soundtrack; and
   determining, from the respective spectrogram masks and the corresponding audio soundtrack, a respective isolated speech spectrogram for each speaker that isolates the speech of the speaker in the video,
   wherein the video convolutional neural network, the audio convolutional neural network, and the masking neural network are trained end-to-end such that network parameters of the video convolutional neural network, the audio convolutional neural network, and the masking neural network are updated jointly on a same set of training samples.

16. One or more non-transitory computer-readable storage media storing instructions that when executed by one or more computers, cause the one or more computers to perform operations comprising:
   obtaining, for each frame in a stream of frames from a video in which faces of one or more speakers have been detected, a respective per-frame face embedding of the face of each speaker;
   processing, for each speaker, the per-frame face embeddings of the face of the speaker using a video convolutional neural network to generate visual features for the face of the speaker;
   obtaining a spectrogram of an audio soundtrack for the video;
   processing the spectrogram using an audio convolutional neural network to generate an audio embedding for the audio soundtrack;
   combining the visual features for the one or more speakers and the audio embedding for the audio soundtrack to generate an audio-visual embedding for the video, wherein the audio-visual embedding represents both audio features of the audio soundtrack and visual features of the respective faces of the one or more speakers;
   processing, using a masking neural network, the audio-visual embedding for the video that represents both the audio features of the audio soundtrack and the visual features of the respective faces of the one or more speakers to generate a respective spectrogram mask for each of the one or more speakers, wherein each spectrogram mask describes time-frequency relationships between clean speech for a respective speaker and background interference in a spectrogram of the audio soundtrack; and
   determining, from the respective spectrogram masks and the corresponding audio soundtrack, a respective isolated speech spectrogram for each speaker that isolates the speech of the speaker in the video,
   wherein the video convolutional neural network, the audio convolutional neural network, and the masking neural network are trained end-to-end such that network parameters of the video convolutional neural network, the audio convolutional neural network, and the masking neural network are updated jointly on a same set of training samples.

17. A method of training a video convolutional neural network, an audio convolutional neural network, and a masking neural network, the method comprising:
   obtaining training data comprising a plurality of training examples, each training example comprising (i) a respective training video and (ii) a ground truth isolated speech spectrogram of the speech of each of one or more speakers in the respective training video; and
   training the video convolutional neural network, the audio convolutional neural network, and the masking neural network on the training data, wherein the training is end-to-end such that network parameters of the video convolutional neural network, the audio convolutional neural network, and the masking neural network are updated jointly on a same set of training samples, the training comprising, for each training example of the plurality of training examples:
      generating, using the video convolutional neural network, visual features for respective faces of the one or more speakers in the respective training video,
      generating, using the audio convolutional neural network, an audio embedding for the audio soundtrack,
      combining the visual features for the one or more speakers and the audio embedding for the audio soundtrack to generate an audio-visual embedding for the respective training video, wherein the audio-visual embedding represents both audio features of the audio soundtrack and visual features of the respective faces of the one or more speakers, wherein the masking neural network is configured to generate a respective spectrogram mask for each speaker in an audio soundtrack associated with the respective training video of the training sample, the generation comprising:

processing, using the masking neural network, the audio-visual embedding for the respective training video that represents both the audio features of the audio soundtrack and the visual features of the respective faces of the one or more speakers to generate the respective spectrogram mask for each of the one or more speakers in the audio soundtrack, and wherein each spectrogram mask describes time-frequency relationships between clean speech for a respective speaker and background interference in a spectrogram of the audio soundtrack.

18. The method of claim 17, wherein obtaining the training data comprises, for each of the training examples:

obtaining, for each of one or more speakers, a clean video of the speaker speaking and a corresponding clean audio soundtrack of speech of the speaker from the clean video;

generating, from at least the clean video and corresponding clean audio soundtrack of the one or more speakers, a mixed video and a mixed audio soundtrack; and generating the training example by associating the mixed video with, for each of the one or more speakers, a spectrogram corresponding to the respective clean audio soundtrack of the speech of the speaker.

19. The method of claim 18, wherein each training example comprises (i) a respective training video of a single speaker and (ii) a ground truth isolated speech spectrogram of the speech of the single speaker in the respective training video, and wherein generating the mixed video and the mixed audio soundtrack comprises augmenting the clean audio soundtrack of the speech of the single speaker with noise.

20. The method of claim 18, wherein each training example comprises (i) a respective training video of a plurality of speakers and (ii) a respective ground truth isolated speech spectrogram of the speech of each of the plurality of speakers in the respective training video; and wherein generating the mixed video with the mixed audio soundtrack comprises mixing the training video for the plurality of speakers and mixing the respective clean audio soundtracks of the plurality of speakers.

21. The method of claim 20, wherein generating the mixed video and the mixed audio soundtrack comprises augmenting the mixed audio soundtracks of the speech of the plurality of speakers with noise.

* * * * *

UNITED STATES PATENT AND TRADEMARK OFFICE
CERTIFICATE OF CORRECTION

PATENT NO. : 11,456,005 B2  
APPLICATION NO. : 16/761707  
DATED : September 27, 2022  
INVENTOR(S) : Mosseri et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 125 days.

Signed and Sealed this  
Twenty-ninth Day of August, 2023

Katherine Kelly Vidal  
*Director of the United States Patent and Trademark Office*